United States Patent [19]

Chang

[11] Patent Number: 5,070,752
[45] Date of Patent: Dec. 10, 1991

[54] STRUCTURE OF DRIVING MECHANISM FOR SCROLL SAWING MACHINE

[76] Inventor: Andy Chang, No. 38, Juan Liau Road, Fong Yuan, Taichung, Taiwan, R.O.C.

[21] Appl. No.: 521,256

[22] Filed: May 8, 1990

[51] Int. Cl.[5] .............................................. B27B 19/02
[52] U.S. Cl. ....................................... 83/781; 83/662; 83/786
[58] Field of Search ................. 83/748, 781, 783, 784, 83/785, 786, 662

[56] References Cited

U.S. PATENT DOCUMENTS

| | | | |
|---|---|---|---|
| 1,707,097 | 3/1929 | Ruschke | 83/781 |
| 1,729,324 | 9/1929 | Bates | 83/781 |
| 2,609,016 | 9/1952 | Bush | 83/781 |
| 4,625,609 | 12/1986 | Ashworth | 83/748 |
| 4,674,381 | 6/1987 | Cadorin | 83/752 |

Primary Examiner—Douglas D. Watts
Assistant Examiner—Eugenia A. Jones

[57] ABSTRACT

A driving mechanism for a scroll sawing machine, which comprises a motor set in parallel with two suspension arms which have a scroll saw blade retained therebetween, and sector-shaped counter weight mounted on the shaft of such a motor and coupled with an universal link which has an opposite end secured to the suspension arms. The rotation of the motor drive the universal link to carry the suspension arms and the scroll saw blade to make a sawing motion for cutting something. Because the motor is set in parallel with the suspension arms, the saw bench is permitted to incline leftward and rightward during sawing operation.

1 Claim, 2 Drawing Sheets

STRUCTURE OF DRIVING MECHANISM FOR SCROLL SAWING MACHINE

BACKGROUND OF THE INVENTION

The present invention is related to driving mechanism for scroll sawing machine and more particularly to a driving mechanism to drive a scroll saw for cutting something into spiral or ornament design permitting a saw bench to incline leftward and rightward during operation.

In recent years, a variety of machine tools and processing machines have been developed for all industries. On the other hand, following the development in material science, a variety of materials may be simultaneously used for making a product. In processing of a product, it is commonly expected to utilize less machinery equipment for maximum capacity. Therefore, compatibility and versatility have become the main factors to consider while purchasing a machinery for material processing because they can help improving a company's competition strength.

In regular scroll sawing machines, a motor is commonly used to drive two suspension arms to carry a scroll saw to make a sawing motion. Because a motor is generally set at one side below two suspension arms, a saw bench is permitted to incline through one direction. Since most people are of right-handed, a motor is generally set at a left side. Therefore, a saw bench is generally permitted to incline rightward. Under this arrangement, it will be very inconvenient to a left-handed operator to manipulate a scroll sawing machine.

SUMMARY OF THE INVENTION:

The present invention has been accomplished under the circumstances in view. It is the main object of the present invention to provide a driving mechanism for a scroll sawing machine which permits a saw bench to incline leftward and rightward according to requirements.

BRIEF DESCRIPTION OF THE DRAWINGS:

The present invention will now be described by way of example with reference to the annexed drawings, in which.

Figure 1:
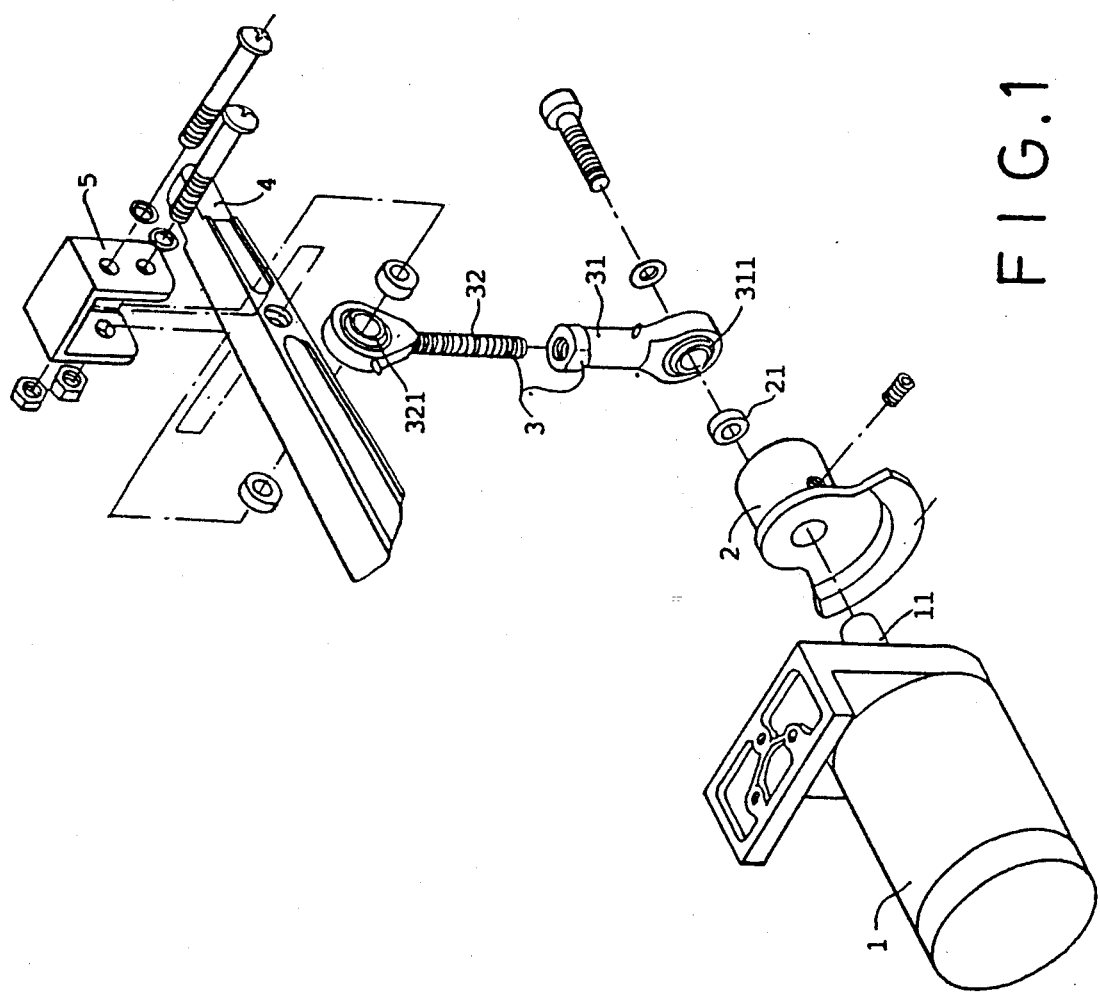
FIG. 1 is a perspective fragmentary view of the present invention.
Figure 2:
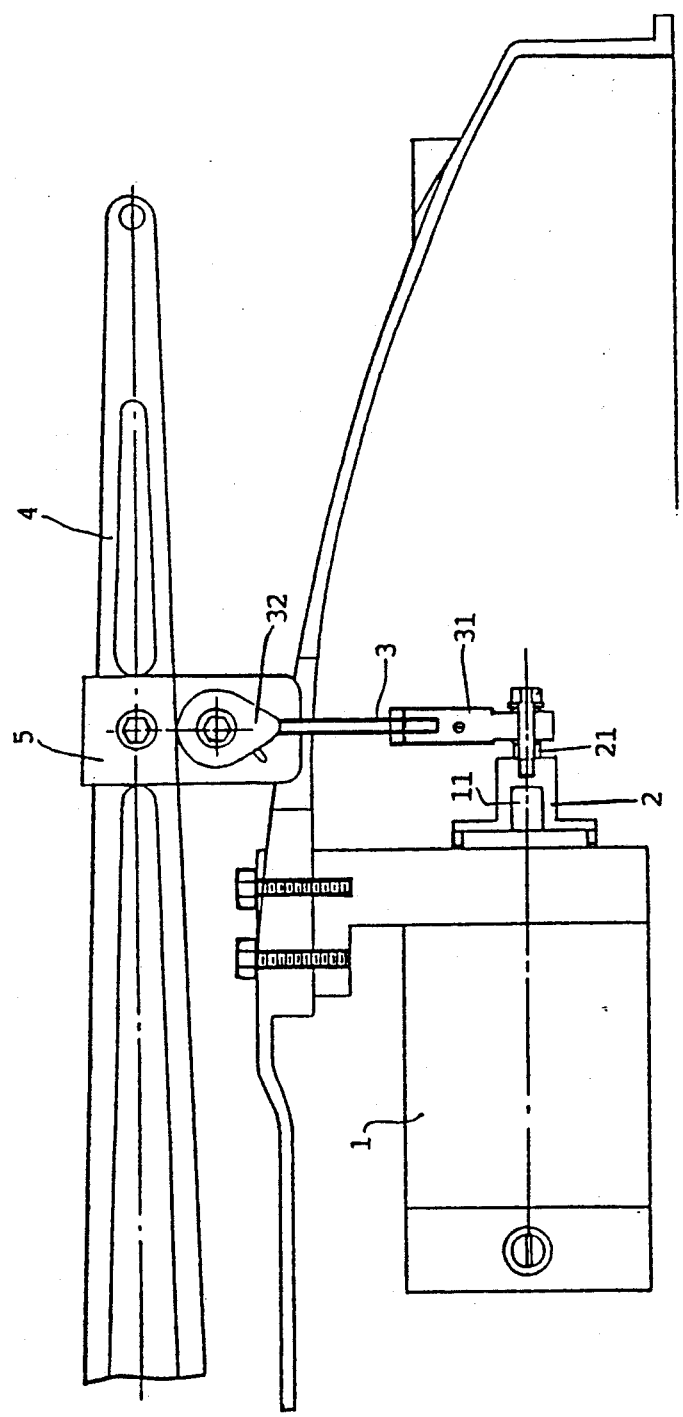
FIG. 2 is a sectional assembly view thereof.

DETAILED DESCRIPTION OF THE PREFERRED EMBODIMENT:

Referring to the annexed drawings in greater detail, therein illustrated is a driving mechanism for a scroll sawing machine in accordance with the present invention is generally comprised of a motor 1, a counter weight 2, an universal link 3, a lower arm 4 and a fixture 5.

The motor 1 is disposed in same direction as the lower arm and has a shaft 11 extending therefrom for power transmission.

The counter weight 2 is a heavy sector block having a hole thereon for the insertion therethrough of the shaft 11 of the motor 1 and a bush 21 for positioning.

The universal link 3 is comprised of a lower link 31 screwed up with an upper link 32. The lower and upper links 31 and 32 have each a hole transversely piercing therethrough at an opposite end for the setting therein of a bearing 311 or 321, in which the hole on the lower link 31 is set in a direction at 90° horizontally away from the hole on the upper link 32. The lower end of the lower link 31 is secured to the counter weight 2 by a screw bolt, while the upper end of the upper link 32 is secured to the lower arm 4 by the fixture 5.

The lower arm 4 is an elongated rod extending from the base of a scroll sawing machine, the front end of which has a fastening device (not shown) to secure one end of a scroll saw blade so as to match with an upper arm of such a scroll sawing machine for carrying a scroll saw blade to make a saw motion.

The fixture 5 is a channel plate having two holes bilaterally piercing therethrough so that two screw bolts are respectively inserted therein to secure the upper link 32 to the lower arm 4.

When the motor 1 is turned on, the counter weight 2 is driven by the shaft 11 to move forward and backward and to simultaneously drive the link 3 to carry the lower arm 4 to move upward and downward. Following the motion of the lower arm 4, the connected upper arm and the scroll saw blade are simultaneously carried to move upward and downward so as to saw something. Because the motor 1 is set in parallel with the lower arm 4, a saw bench can be adjusted to incline leftward or forward according to the processing process required when a working piece is mounted thereon and set at a lower position beneath the lower arm 4.

It is to be understood that the above drawings and description are for better understanding of the present invention and not intended as a definition of the limits and scope of the invention disclosed. Recognizing that various modifications been apparent the scope herein shall be defined in the claim as set forth hereinafter.

What is claimed is:

1. A scroll saw machine comprising a base having a saw bench for supporting a workpiece, a saw blade connected to an upper suspension arm and a lower suspension arm (4), said upper arm and said lower arm having upper and lower ends, a driving mechanism comprising a motor (1), a counterweight (2), a universal link (3), a shaft (11) extending from said motor for connecting said motor to said lower arm, said lower arm being an elongated rod extending from the base of said scroll saw machine and having a fastening device on its front end for securing said saw blade thereto; said motor being located below and in parallel with said lower arm, said counterweight being a block having a hole for fastening said shaft therein; said universal link (3) comprising a lower link (31) connected to an upper link (32), said lower link having a hole on its lower end for connecting with said counterweight and said shaft (11) by means of a screw bolt, said upper link (32) having a hole on its upper end set in a direction at 90° horizontally away from the hole on said lower link and connected to said lower arm (4); a fixture mounted on said lower arm (4) to secure said upper link thereto by a screw bolt, whereby when said motor is actuated, said shaft (11) drives said counterweight (2) to move forwardly and backwardly and said link (3) drives said lower arm (4) to move upwardly and downwardly and said saw bench may be adjusted to incline leftwardly or rightwardly.

* * * * *